United States Patent
Fain et al.

(10) Patent No.: US 7,685,197 B2
(45) Date of Patent: Mar. 23, 2010

(54) SYSTEM AND METHODS FOR INDENTIFYING THE POTENTIAL ADVERTISING VALUE OF TERMS FOUND ON WEB PAGES

(75) Inventors: Daniel C. Fain, Los Angeles, CA (US); Thomas Pierce, Pasadena, CA (US)

(73) Assignee: Yahoo! Inc., Sunnyvale, CA (US)

( * ) Notice: Subject to any disclaimer, the term of this patent is extended or adjusted under 35 U.S.C. 154(b) by 173 days.

(21) Appl. No.: 11/122,780

(22) Filed: May 5, 2005

(65) Prior Publication Data

US 2006/0253437 A1    Nov. 9, 2006

(51) Int. Cl.
*G06F 17/30* (2006.01)
(52) U.S. Cl. ............. 707/732; 707/767; 705/14.54; 705/14.55
(58) Field of Classification Search ............ 707/5, 707/2
See application file for complete search history.

(56) References Cited

U.S. PATENT DOCUMENTS

| | | | | |
|---|---|---|---|---|
| 5,933,811 | A * | 8/1999 | Angles et al. | 705/14.56 |
| 5,948,061 | A * | 9/1999 | Merriman et al. | 709/219 |
| 6,134,532 | A * | 10/2000 | Lazarus et al. | 705/14.25 |
| 6,460,036 | B1 | 10/2002 | Herz | 707/10 |
| 6,560,578 | B2 * | 5/2003 | Eldering | 705/14 |
| 6,615,247 | B1 * | 9/2003 | Murphy | 709/217 |
| 6,725,259 | B1 | 4/2004 | Bharat | 709/219 |
| 6,804,659 | B1 * | 10/2004 | Graham et al. | 705/14 |
| 6,934,740 | B1 * | 8/2005 | Lawande et al. | 709/213 |
| 7,054,900 | B1 * | 5/2006 | Goldston | 709/203 |
| 2002/0165849 | A1 * | 11/2002 | Singh et al. | 707/1 |
| 2003/0101451 | A1 * | 5/2003 | Bentolila et al. | 725/34 |
| 2003/0105677 | A1 * | 6/2003 | Skinner | 705/26 |
| 2004/0267723 | A1 * | 12/2004 | Bharat | 707/3 |
| 2005/0144064 | A1 * | 6/2005 | Calabria et al. | 705/14 |
| 2006/0010105 | A1 * | 1/2006 | Sarukkai et al. | 707/3 |
| 2006/0036585 | A1 * | 2/2006 | King et al. | 707/3 |
| 2006/0136411 | A1 * | 6/2006 | Meyerzon et al. | 707/5 |

OTHER PUBLICATIONS

Marc Langheinrich, Atsuyoshi Nakamura, Naoki Abe, Tomonari Kamba, Yoshiyuki Koseki, Unintrusive Customization Techniques for Web Advertising, Proc. 8th International World Wide Web Conference. pp. 181-194, Toronto, May 1999.*

* cited by examiner

*Primary Examiner*—Pierre M Vital
*Assistant Examiner*—Augustine Obisesan
(74) *Attorney, Agent, or Firm*—Seth H. Ostrow; Ostrow Kaufman & Frankl LLP

(57) ABSTRACT

The present invention provides a method and system for identifying terms in a requested Web document which can be used to identify other web page documents in which the user is likely to have an interest. Terms on previously prepared lists are compared to the content of the Web page document, and where matches are found, mathematical techniques including linear regression can be used to determine the relevance of the textual term to the content of the page. This can be used to suggest other linked Web page documents in which the user is likely to have an interest. Where the prepared lists include a term that has been purchased by advertisers, and there is a match for that term on the Web page document, an ad which is likely to interest the reader can be displayed on the requested Web page document, and can include a link to the advertiser's web site.

12 Claims, 9 Drawing Sheets

SYSTEM AND METHODS FOR INDENTIFYING THE POTENTIAL ADVERTISING VALUE OF TERMS FOUND ON WEB PAGES

CROSS-REFERENCE TO RELATED APPLICATIONS

This application is related to pending U.S. patent application Ser. No. 10/910,780, entitled "Content Performance Assessment Optimization for Search Listings in Wide Area Network Searches", having a common assignee, by inventors Kurt Mortensen, Dominic Cheung, Alan Lang, Scott, Snell, Jie Zhang and Pierre Wang, filed on Aug. 2, 2004, herein incorporated by reference in its entirety.

BACKGROUND OF THE INVENTION

The present invention relates to identification of keywords in documents. More particularly, the present invention relates to methods and apparatus for identifying World Wide Web document keywords of potential advertising value so that appropriate advertisements can be displayed.

Advertising based on keywords typed into search engine windows has been very successful in generating revenue for web sites such as Yahoo! and Yahoo! affiliates. In addition to using keywords to search for web pages, it is also possible to arrive at web pages by links from other pages or by typing in a URL, thereby presenting additional opportunities for generating advertising revenue. For example, a user may navigate to the URL www.yahoo.com, review the Yahoo! news section, and then selectively read news articles of interest by clicking on a summary of the story or a photograph of the story. In such instances, keywords have not been provided by the user.

In the absence of keywords provided by the user, an advertiser may have to resort to randomly advertising on web pages hoping to attract readers who may have an interest in the advertiser's products which may or may not be related to the web pages. To take advantage of this opportunity to better generate additional revenue offered by web page space where the user who has not arrived at a web page as a direct result of a search engine query, i.e., where the user has not provided keywords, an advertiser needs to select and target these ads as closely as possible to the user's potential interest, which may be indicated by the user's selection of the website and web pages. Such better targeted advertising will result in a better experience for the user, as well as greater income for advertisers and web publishers.

What is needed is an automated process that best associates ad links with the text of the web page being viewed by the user and therefore enables the website to place these ad links with a high probability that these ad links will be of interest and better serve the needs of the user without requiring keywords provided from the Web user. Intuition and imaginative application of mathematical methodologies are key to achieving this.

SUMMARY OF THE INVENTION

A computer-implemented method and system for estimating the interest of a user, given that they visit a Web page. Useful in association with at least one list of rated term-page topics, the method includes eliminating extraneous content form the document, examining the Web page document for textual terms that are found on the list of monetized terms, computing the relative significance of the terms identified on the Web page document, and ranking them according to their significance level. The textual terms can include alphabetic or non-alphabetic words, in contiguous or non-contiguous groups or as single words, word fragments or phrase fragments.

The method improves the value of Web links for users, Web site owners and advertisers by computer-extraction of terms on a given Web page, followed by a determination of the relevance of those terms to the subject matter of the Web page by assigning numeric features to the terms and submitting the result to a trained learning machine to rank the value of each term according to the relevance of the term to the subject of the Web page. Rankings of the terms on a web page can be refreshed periodically in response to new or different information.

Using the likely relevance ranking determined by a learning machine trained on rated term-page topics large enough to be statistically reliable and selected either at random or according to specific characteristics including web site category and content, a computer trained to determine the likely relevance of the terms extracted from a Web page to the content of that Web page can examine any given web page for terms likely to be relevant to the topic of the page, and identify and rank terms according to their likelihood of being relevant.

Relevant terms which have been bought by advertisers can be used to select a page-appropriate ad to be displayed for the user along with search results, the advertiser billed accordingly and user response logged.

Note that the various features of the present invention can be practiced alone or in combination. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
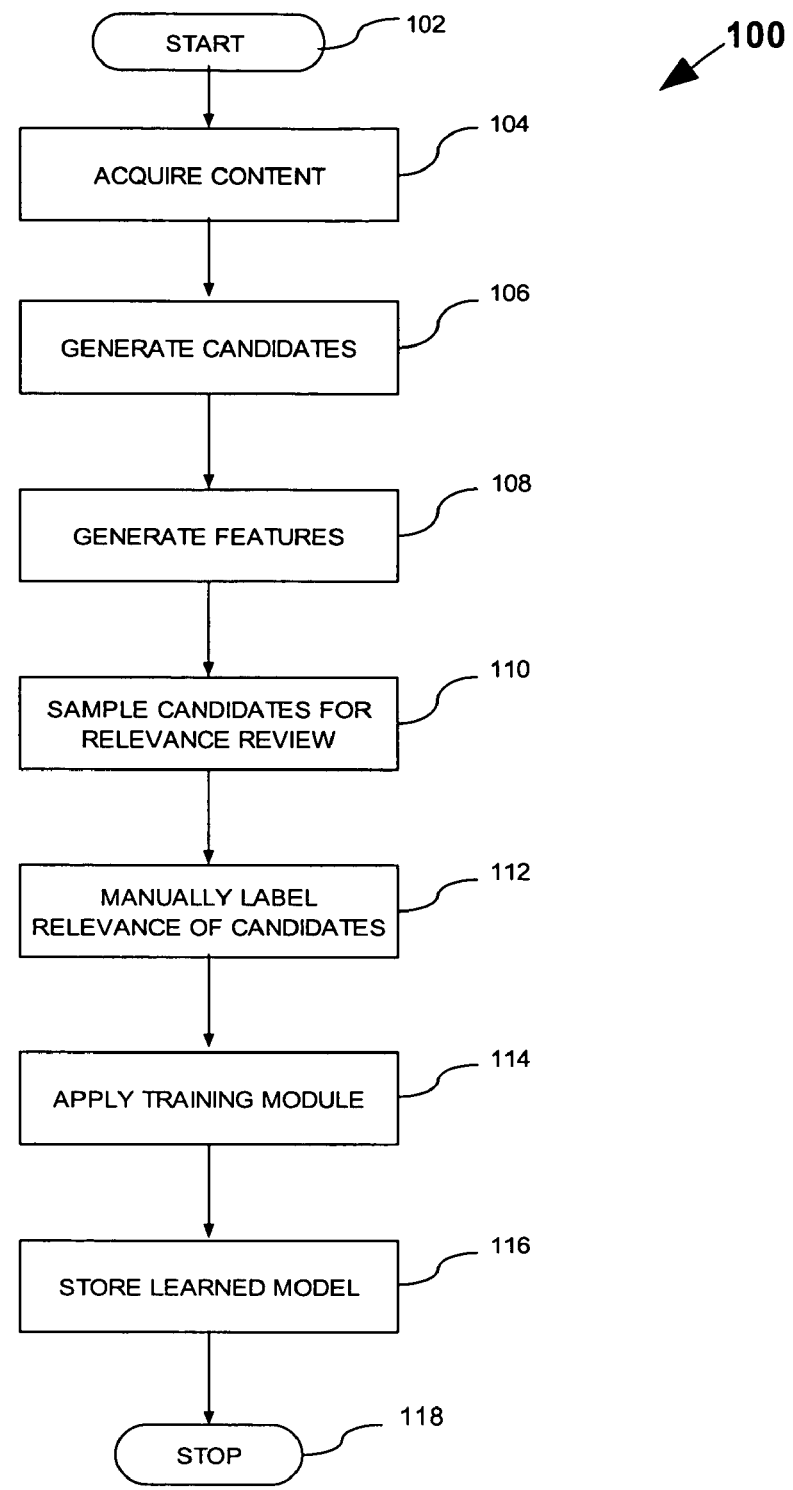
FIG. 1 is logic flow diagram showing a learning machine training process in accordance with the present invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

Knowing the likely relevance of a Web page term makes it possible for an ad-serving system to improve the targeting of advertising on Web pages. This creates more opportunity for advertisers, web site publishers and the providers of ad serving systems.

Rather than using a user-supplied keyword to trigger an ad as is done with search engines, Web page content is used to identify its own keywords. The relevance of a term on a Web page is determined by the likely usefulness of that term for understanding the interest of a user who visits the Web page.

Assuming that the user is interested at looking at more pages like the Web page he is presently viewing, it is possible to understand better the Web user's interests by training a computer to determine the relevance of the terms found on the Web page to the Web page topic. After such training, candidate terms can be selected from any given Web page and subjected to the trained model in order to determine the relevance of each candidate term to the content of the Web page on which the candidate terms are found.

Instances of a candidate textual term include an individual alphabetic word, an alphabetic word fragment, a non-alphabetic word, a non-alphabetic word fragment, an acronym, an abbreviation, an individual symbol, an alphabetic letter, a non-alphabetic word component, and a number. Instances of terms also include groups of these in any of various relationships including two or more contiguous alphabetic words or word fragments; two or more contiguous non-alphabetic words or word fragments; two or more contiguous symbols; two or more contiguous numbers; two or more contiguous acronyms; and various combinations of alphabetic and/or non-alphabetic words and/or word fragments and/or symbols and/or acronyms and/or numbers, and/or abbreviations. It is not necessary that the parts of a single term, whether including alphabetic words and word fragments, non-alphabetic words and word fragments, numbers, symbols, acronyms, and abbreviations are either contiguous or appear in a particular order. 'Coffee cup', and 'cup of coffee' both can be considered to contain the candidate term 'coffee cup'.

Not every word on a page is judged for relevance as a possible term. Words including articles, conjunctions, prepositions and pronouns, as well as many frequently used adjectives, adverbs and verbs can often be, in many cases, ignored altogether, as are policy statements, non-targeted banner advertisements and other boiler plate text which can be expected to be independent of the subject of the page on which it is found.

While the invention is discussed herein in relation to alphabetic languages, the invention is applicable to any terms comprised of one or more terms including one or more strings of ASCII or Unicode characters, or any similar code.

When a publisher wants to sell Web page ad space to an advertiser, the present invention can improve the targeting of ads by identifying one or more relevant terms on each of the pages on which the publisher wants to sell ad space. This is done for a page by first ridding the page of extraneous material including policy statements, non-targeted banner advertisements, and words including common articles and conjunctions, then identifying possible candidate terms by matching terms on the page to a collection of terms on which advertisers bid, using the features of those terms to represent each in a common attribute-space, and scoring each according to a learned model and ranked according to relevance to the subject of the page. Those terms with adequate relevance can be identified as keywords for ads, so that advertisements using that particular term can be displayed in the ad space on that particular page.

Building a Trained Model

In one embodiment, the process of using a computer to build a trained model 922 for use by ad serving system 908 in determining the relevance of the terms on a given Web page begins in step 102. In step 104 a group of randomly-selected Web pages are acquired and are divided into a training set and a test set. The training set is used to train the computer to examine the text of a Web page for terms that are relevant to the subject matter of the page. The test set is set aside until the training phase is complete; it will be used to evaluate the ability of the trained computer.

To begin the training process, select one of the Web pages from the training set and remove from the Web page any extraneous material, including the site name, site policy statements, non-targeted banner advertisements and any other content not considered relevant to the subject of the Web page. In step 106, generate candidates by applying content match systems and/or match drivers to a term from the selected training set Web page, comparing the term on the selected training set Web page to a term found among a group of collected candidate terms including both editorial selections by individuals and terms derived from computer-selected historical data. Numeric feature values are assigned to the candidates in step 108, a sample of the candidates is selected in step 110 for relevance review, and the relevance of each sample candidate is manually labeled in step 112.

The numeric feature values for each candidate make it possible to use statistical regression techniques in step 114 to determine the relevancy of candidate terms, resulting in a trained model 922 to determine the comparative relevance of each candidate to the subject matter of a web page on which it appears In step 112, a person labels the candidate term relevant or not relevant or assigns degrees of relevance of the candidate to the subject of the selected Web page. In another embodiment where terms are examined for their relevance to the subject matter of the Web page, the training set is created using more than one relevance grade, including 'not relevant', 'relevant' and 'very relevant'. It should be understood that more grades are possible and are advantageous with some material.

The training module 114 is applied to the features and relevance ratings of the training set of candidates beginning with 802. After the training set has been identified in step 804, statistical techniques are applied to the each candidate term's numeric features and relevance ratings in step 806. One well-known standard information retrieval technique is a scoring rule which uses the product of tf (term frequency) and idf (inverse document frequency) tf·idf. The term's frequency, tf, is the number of times the term is found on a particular web page document, and idf (inverse document frequency) is the number of documents on which the term is found in the training set.

Where, during the training cycle, $g_1 = tf(k,p)$ and $f_1 = df(k)$, and k is the term and p the Web page document, the scoring function $o(k,p)$ using the training data, $g_1$ and $f_1$, is described by $$o(k,p) = \beta_1 \log f_1(k) + \gamma_1 \log g_1(k,p) \qquad \text{(equation A)}$$

which involves calculating a scoring model using all the terms, k and p, in the training set. If the training data indicate that tf·idf ranking is optimal, then $\beta_1$ will be positive and $\gamma_1$ will be negative.

Term frequency (the number of times a candidate term appears on a particular Web page), and document frequency (the number of times it appears throughout the entire set of training documents) can be the sources of the numeric features used to calculate a trained model to be used for assessing the relevance of candidate Web page terms. Other features of candidate Web page terms can include the number of characters in a candidate term, the number of words in a candidate term, the search frequency (how often the term is submitted to a search engine by any user). Using linear regression, the scoring function can be described for any i as $$o(k,p) = \alpha + \Sigma \beta_i \log f_i(k) + \Sigma \gamma_i \log g_i(k,p)$$ (equation B)

The parameters of the learned model are identified in step 810 and the application of the training process stops in step 812. Developed through the use of known statistical regression techniques these parameters of the learned model provide a means by which the comparative relevance of candidates identified on any web page can be predicted by calculations utilizing the same kind of numeric features used to develop the learned model.

The statistical regression techniques used make it possible to rank the comparative relevance of relevant terms, and sell advertising links to those terms for an agreed period.

Using the Trained Model to Determine the Relevancy of Terms on a Given Web Page

Included in URL-related terms 919 in storage 916 of ad serving system 908 are terms ranked for their relevance to the content of the Web page with which they are stored. This is accomplished by using the trained model to identify and rank relevant terms on the web pages of publishers who are clients of the company responsible for ad serving system 908. The publisher then can put a reference to the advertising system in each Web page document which has ranked relevant terms stored in 919 so that when the Web page document is sent to the browser of a WWW user, the reference to the advertising system causes the user's content-viewing device to send a request to ad serving system 908 to send an ad for display on that Web page by the WWW user's browser. Clearly, Java programs and other similar files can also be used to notify ad serving system 908 of the request of a Web page document. The ad that is sent is determined by a ranked relevant term included database 919. The ranking of the terms can be updated, including times when the training model is refreshed, and when the content of the page changes without a change in the URL. All ranked terms can be stored or only the most highly ranked terms, according to the needs of the ad serving system provider.

Figure 2:
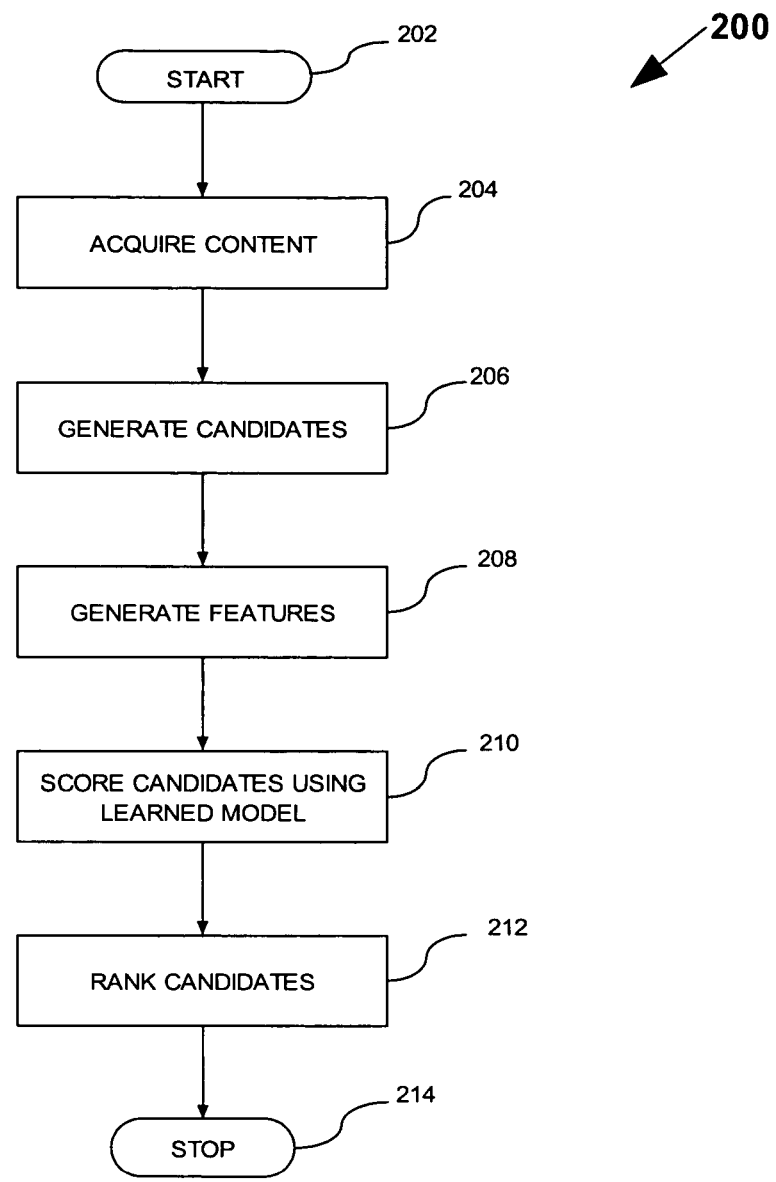
FIG. 2 is a logic flow diagram showing the process by which terms relevant to the subject matter on a Web page are ranked according to their relevance to the subject of the Web page in accordance with the present invention.
Figure 3:
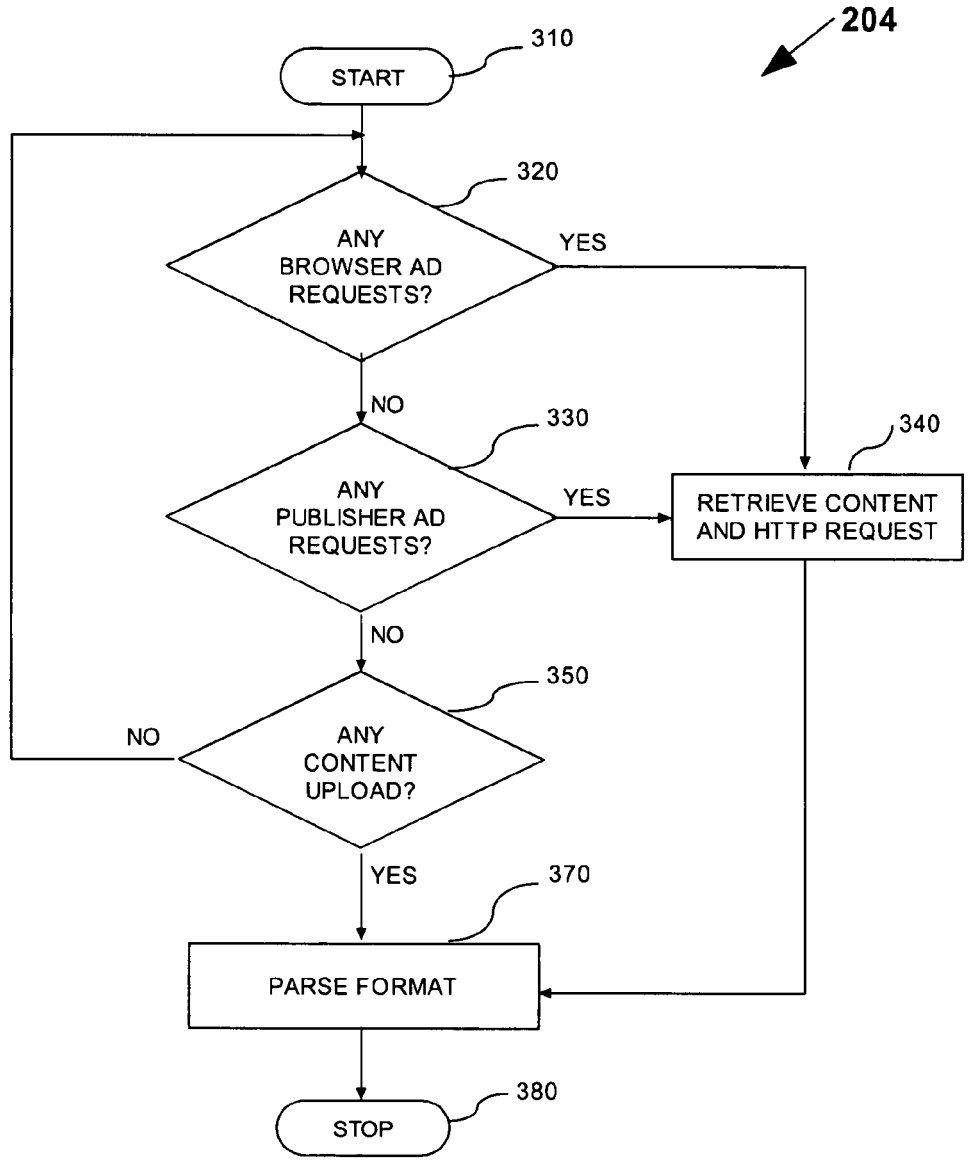
FIG. 3 is a logic flow diagram showing the process by which Web page content is acquire in step 204 of FIG. 2.

These ranked terms are terms which were extracted from the Web page by the process seen in FIG. 2, beginning with step 202. The process of finding candidate terms and ranking them according to their relevance to the content of the page begins with the acquisition of a Web page in step 204 which is seen in more detail in FIG. 3, beginning with step 310. FIG. 3 shows that a request for content can come to ad serving system 908 from sources including ad requests from publishers in step 330 and users' browsers in step 320 as well as from content uploads in step 350. Where the ad request is from a publisher in step 330, the Web page is retrieved in step 340 and its content parsed in step 370 to reduce extraneous material, and the acquisition of this particular content is complete and stops in step 380.

Figure 4:
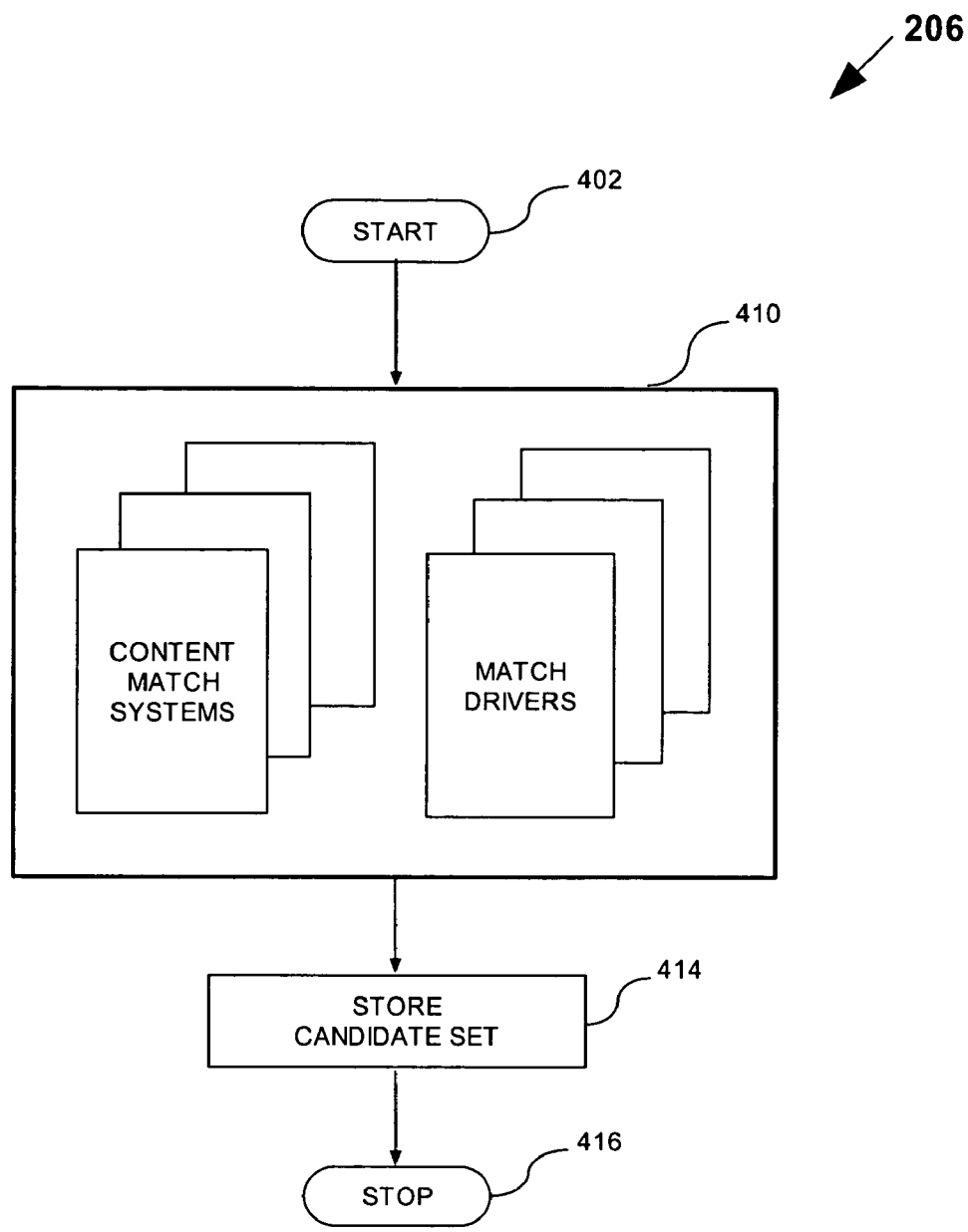
FIGS. 4 and 5 are logic flow diagrams showing the processes by which candidates and candidate feature values, respectively, are generated in steps 206 and 208 of FIG. 2.

Step 206 generates candidate terms from the content of the page acquired in step 204. FIG. 4 shows the candidate generation process, which begins in step 402. Step 410 uses several effective means to search the Web page document for candidate terms. Efficacious candidate generators include a 'phrase extractor' which looks through the Web page document for phrases from a prepared list which appear in the document. Another candidate generator is a 'transducer' which normalizes and segments possible candidates in various ways, including replacing the character sequence 'ies' by 'y', and replacing upper case letters with lower case letters. Yet another candidate generator performs word and phrase normalizations including depluralization, stop-wording, spelling correction, and synonym collapse—such as car=auto and compares them to prepared lists. The candidate terms can include words that are quite distant in the Web page content; for example the words 'Paris' and 'travel' can be widely separated in the Web page text and yet together cause the phrase "Paris travel" to be discovered as a candidate term. Various other compilations of terms as well as methods of constructing or deconstructing text are also used as candidate generators in order to identify candidates by matching words in the content of the Web page to words and groups of words in prepared lists. The match does not have to be an exact match of the on one of the lists. A list can consist of terms entirely different from the candidate term, but suggested by the candidate term.

After content match systems 411 and/or match drivers 412 are used in step 410 to compare the content of the Web page document to a list of terms that have been bid on by advertisers, those terms in the Web page document which match terms on the list of terms that are bid on by advertisers are accumulated in step 414 and the candidate generation process for the Web page document is complete and stops in step 416.

Figure 5:
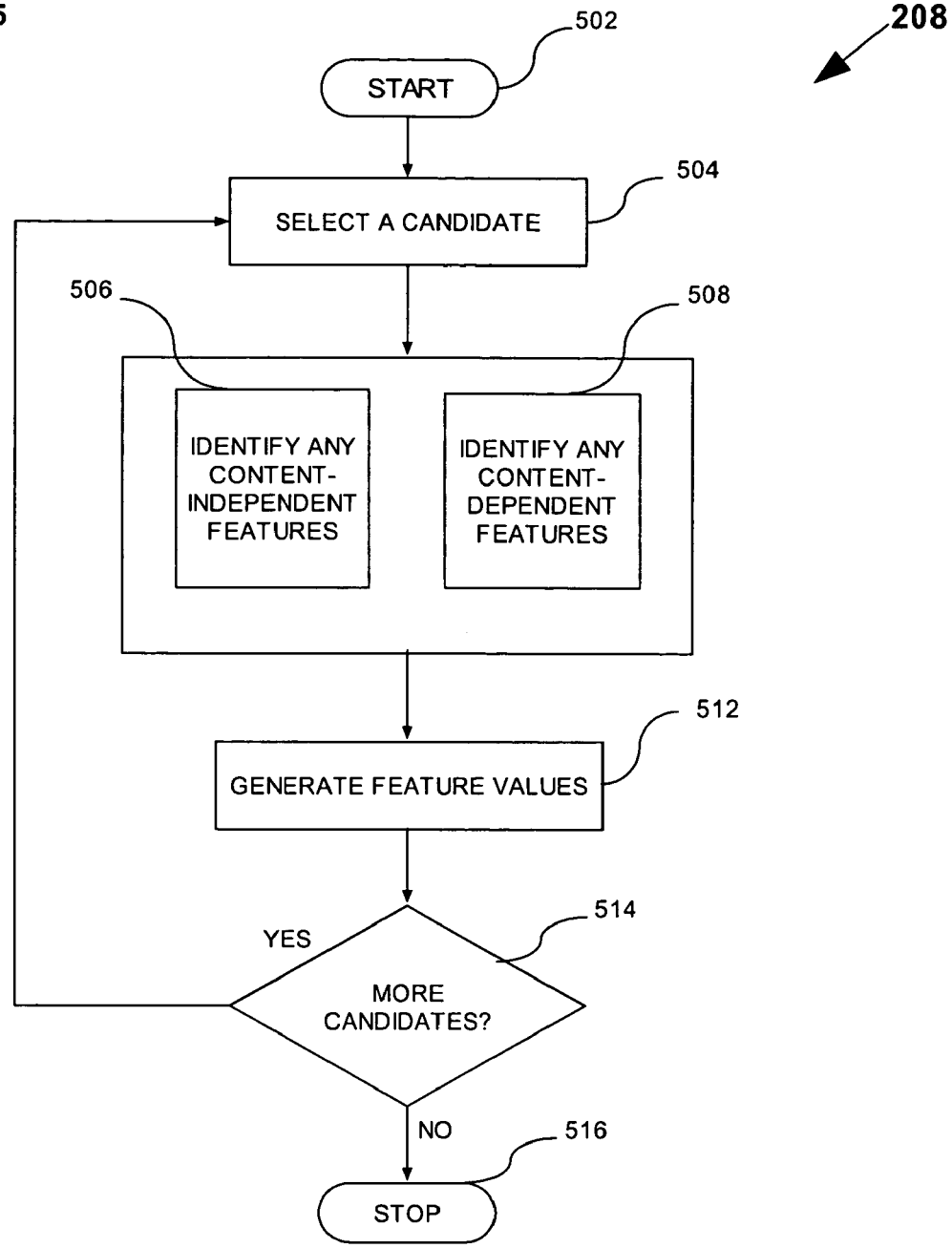

In order to subject candidate terms to the learned model so as to score and rank the terms for relevance, it is necessary to give them numerical attributes relating to features including the frequency with which the term is found on the Web page document. Some features may be context dependent, including how many words in the Web page document precede the candidate term. Other features, including the number of words in the candidate term or its position in the document may be context independent. FIG. 5 shows the process of step 208. Generation of features of the candidate terms begins with step 502. A candidate is selected in step 504. Numerical values representing the features are generated in step 512. If step 514 finds more candidate terms, another candidate term is selected in step 504 and the feature generation process is repeated for that candidate term. When there are no more candidate terms, the feature generation process is complete for the Web page document and the feature generation process stops in step 516.

Figure 6:
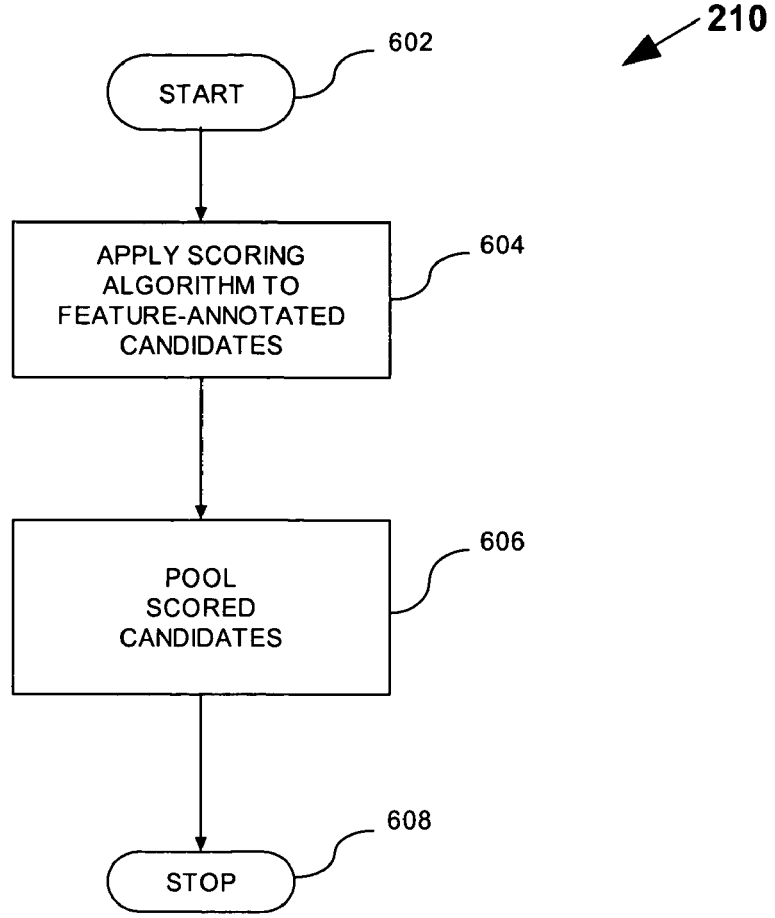
FIG. 6 is a logic flow diagram showing the scoring of candidates in step 210 of FIG. 2.

The candidate terms can be scored in step 210 by applying the learned model to the candidate terms, using the numerical features generated in step 208. This process is shown in FIG. 6, where it starts at step 602. In step 604 the application of the learned model to the numeric attributes of the features of the candidate terms gives a score to each of the candidate terms. The scored candidate terms are pooled in step 606, and the scoring process is complete and stops at step 608.

Figure 7:
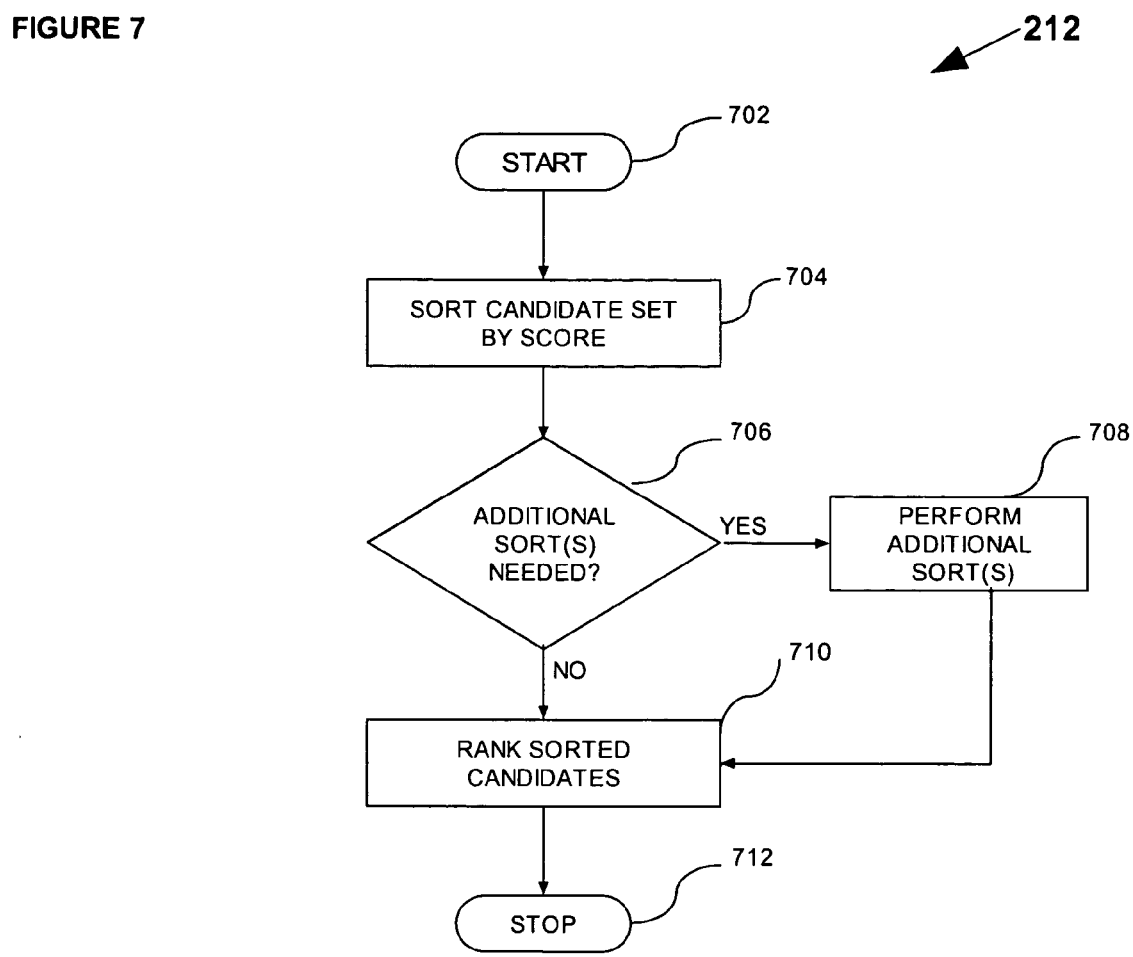
FIG. 7 is a logic flow diagram showing the use of a ranking module to rank scored candidates in step 212 of FIG. 2.
Figure 8:
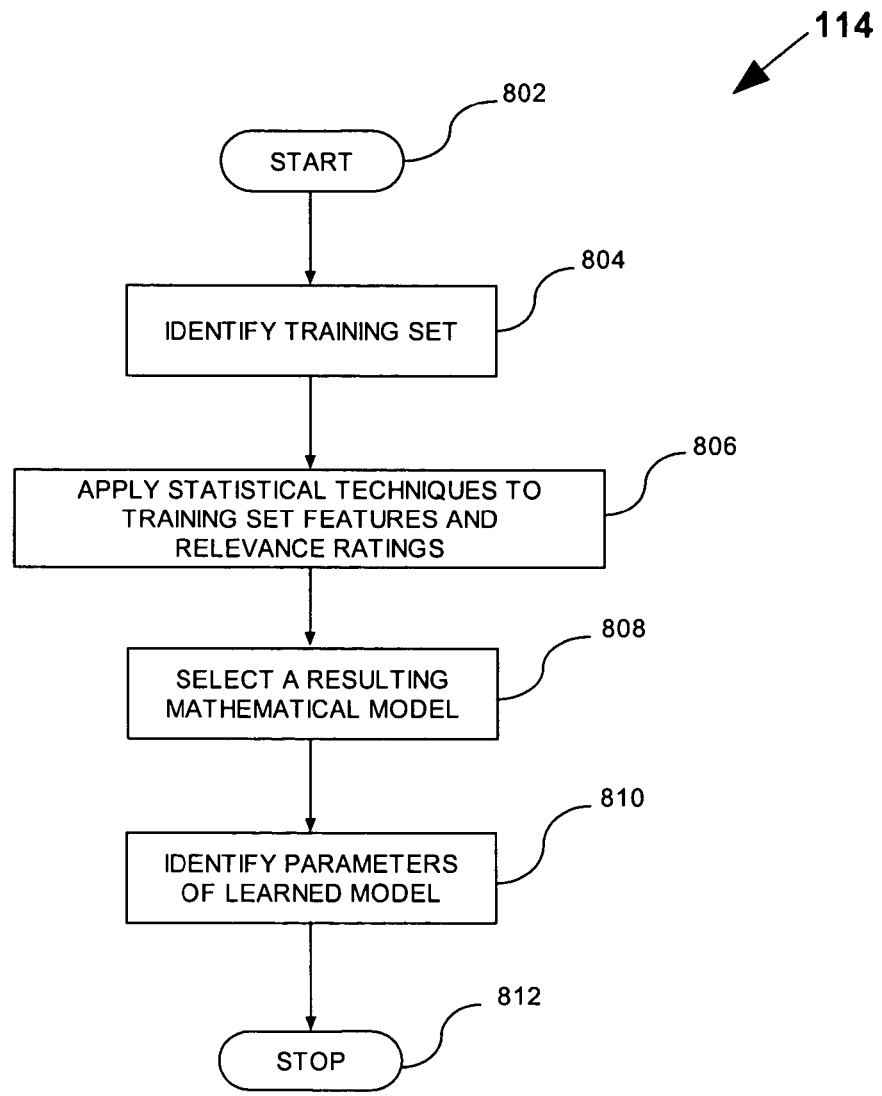
FIG. 8 is a logic flow diagram showing the use of a training module in step 114 of FIG. 1 to determine parameters for a learned model.
Figure 9:
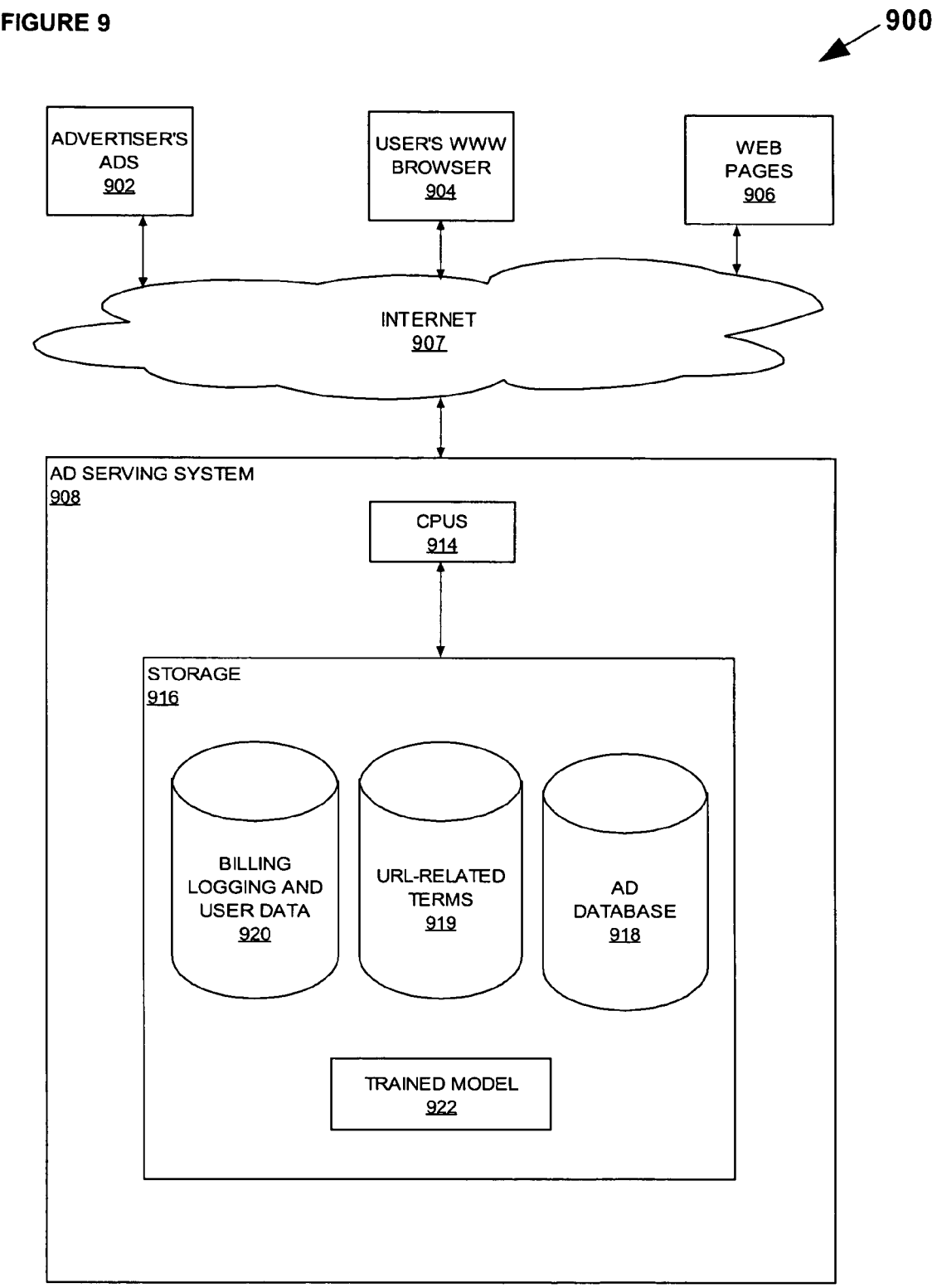
FIG. 9 is a block diagram showing the components of the ad serving system used to serve an advertiser's ads for display on a user's browser along with the page requested from a web site by the user of the browser.

The scored candidate terms are then ranked in step 212 which is shown in some detail in FIG. 7, where the process begins with step 702. The candidate terms are sorted according to their scores in step 704. Sometimes, one or more sorts, including sorting by advertising value, in addition to sorting by scores will be desirable for helping to determine an appropriate ranking. If it is determined in step 706 that other sorts including topic areas and top-few by click-through criteria are desirable for properly ranking the candidate terms, these sorts are done in step 708. Ranking, then, can result in more than one list of ranked candidate terms. But whether ranked only by score or by other criteria, the one or more ranked list of candidate terms is accumulated in step 710, the scoring process stops in step 712 and the relevance of terms on the Web page document has been determined, the terms ranked, and the process completed in step 214.

In another embodiment, identifying relevant terms on a Web page document that has no pre-existing term relevance data associated with the Web page document in URL-related terms 919 can be accomplished on-the-fly as a direct part of the process of FIG. 2—where an ad is returned in response to a referenced request—by subjecting the page to the trained model 922. This can serve as a means of supplementing the data in URL-related terms 919. In yet another embodiment, no term relevance data is stored in URL-related terms 919. Instead, when an ad relevant to a Web page is requested from ad serving system 908 the Web page is simply subjected directly at that time to the process shown in FIG. 2, and subjected to the trained model 922, where a relevant term can be used to fetch an ad from ad database 918 so that the ad serving system 908 can return the ad to the user's World Wide Web (WWW) browser.

While this invention has been described in terms of several preferred embodiments, there are alterations, modifications, permutations, and substitute equivalents, which fall within the scope of this invention. It should also be noted that there are many alternative ways of implementing the methods and apparatuses of the present invention. Although sub-section titles have been provided to aid in the description of the invention, these titles are merely illustrative and are not intended to limit the scope of the present invention. In addition, while the above description of this invention has been in its implementation for using the subject of a random Web page to establish desirable terms for use in advertising links, one skilled in the art would be able to implement the present invention in other applications where the purpose is to establish a relationship between the subject matter of a Web page and the terms found on that page. Hence this invention is useful in many applications where there is a desire to use the content of one page to establish links to one or more other pages.

It is therefore intended that the following appended claims be interpreted as including all such alterations, modifications, permutations, and substitute equivalents as fall within the true spirit and scope of the present invention.

The invention claimed is:

1. A computer-implemented method for estimating an interest a reader has in a requested document, useful in association with a list of textual terms with advertising value, the method comprising:

building a trained model comprising using linear regression to identify a scoring function based on textual terms and associated documents, wherein the scoring function is of the form:

$$o(k,p) = \alpha + \Sigma \beta_i \log f_i(k) + \Sigma \gamma_i \log g_i(k,p)$$

wherein $\beta_i$ and $\gamma_i$ are comparative relevance attributes and $\alpha$ is a relevancy factor; wherein k is a term factor and p is a web document identifier, eliminating extraneous material from the requested document;

comparing a plurality of textual terms of the requested document to the list of textual terms with the advertising value, wherein the advertising value is based upon a bid value associated with one or more textual terms of the list of textual terms by one or more advertisers and the textual terms also including non-contextual features;

computing a significance level based on the trained model for each of the plurality of textual terms of the requested document found on the list of textual terms with advertising value according to the advertising value of each of the plurality of terms of the requested document and computing the significant level based on the non-contextual feature of the positions of the textual terms in the requested document;

ranking each of the plurality of textual terms of the requested document found on the list of textual terms with advertising value according to the significance level of each of the plurality of textual terms of the requested document that are found on the list of textual terms with advertising value;

selecting one or more of the plurality of ranked textual terms as keywords to search for one or more relevant advertisements; and displaying the one or more relevant advertisements along with the requested document.

2. The method of claim 1 wherein the plurality of textual terms of the requested document include individual alphabetic words.

3. The method of claim 1 wherein the plurality of textual terms of the requested document include groups of at least two contiguous alphabetic words.

4. The method of claim 1 wherein the plurality of textual terms of the requested document include groups of at least two non-contiguous alphabetic words.

5. The method of claim 1 wherein the plurality of textual terms of the requested document include fragments of alphabetic words.

6. The method of claim 1 wherein the plurality of textual terms of the requested document include numbers.

7. The method of claim 1 wherein the plurality of textual terms of the requested document include individual non-alphabetic words.

8. The method of claim 1 wherein the plurality of textual terms of the requested document include groups of at least two contiguous non-alphabetic words.

9. The method of claim 1 wherein the plurality of textual terms of the requested document include groups of at least two non-contiguous non-alphabetic words.

10. The method of claim 1 wherein the requested document is a document accessed from a wide area network.

11. The method of claim 1 wherein features of each of the plurality of textual terms of the requested document found on the list of textual terms used by the learning machine to compute the significance level for each of the textual terms of the requested document found on the list of textual terms include contextual features.

12. The method of claim 1 wherein ranking of each of the plurality of textual terms of the requested document found on the list of trained textual terms according to the significance level of each of the plurality of textual terms of the requested document found on the list of textual terms includes ranking by advertising value.

* * * * *